United States Patent Office.

RENÉ BOHN, OF MANNHEIM, GERMANY, ASSIGNOR TO THE BADISCHE ANILIN AND SODA FABRIK, OF LUDWIGSHAFEN, GERMANY.

BLACK DYE AND PROCESS OF MAKING SAME.

SPECIFICATION forming part of Letters Patent No. 661,438, dated November 6, 1900.

Application filed June 29, 1900. Serial No. 22,063. (Specimens.)

*To all whom it may concern:*

Be it known that I, RENÉ BOHN, a doctor of philosophy, and a citizen of the Swiss Republic, residing at Mannheim, in the Grand Duchy of Baden, Germany, have invented new and useful Improvements in Black Coloring-Matter, of which the following is a specification.

My invention relates to the production of a new black coloring-matter from 1.8 dinitro-naphthalene. The said new coloring-matter is obtained by treating at a high temperature a solution of 1.8 dinitro-naphthalene in concentrated sulfuric acid with a sulfid, preferably hydrogen sulfid. It appears that a naphthazarin intermediate product is formed during this treatment and that this is converted into the new coloring-matter. The new coloring-matter reacts with bisulfites or sulfites and is converted into a more soluble form. It is, especially in this more soluble form, excellently adapted for use in printing cotton goods, the printing being effected by the addition of a metallic mordant—for instance, chromium acetate. Gray to deep-black lakes can thus be obtained on the fiber, and these are characterized by a high degree of beauty and fastness, so that in this respect the new color is equal or superior to that obtained with naphthazarin. Further, the price at which my new coloring-matter can be produced is so low that it replaces logwood by a coal-tar product in a way that has not hitherto been attained.

The following examples will serve to further illustrate my invention and the manner in which it can be carried into practical effect and my new coloring-matter obtained. The parts are by weight.

Example 1: Mix about one hundred (100) parts of 1.8 dinitro-naphthalene in an iron vessel with from one thousand (1,000) to two thousand (2,000) parts of sulfuric acid, (containing about ninety-six per cent. $H_2SO_4$.) Heat the mixture to about 130° centigrade. When solution is practically complete, pass in a stream of hydrogen sulfid (sulfureted hydrogen) while continually stirring the mixture. The solution, which is at first yellow, during this treatment turns red, and if test portions be taken and poured into water a blue-black body separates out, which dissolves in caustic soda, the solution being blue. Continue the treatment with hydrogen sulfid until tests that are made from time to time show that practically no dinitro-naphthalene remains unchanged. This is usually the case, in about from six to eight hours. Allow the melt to cool, pour it into five hundred (500) parts of water, boil, allow to cool, filter, and wash the product remaining on the filter. The product thus obtained has some naphthazarin mixed with it. I have found that this can be removed, if desired, by extracting by means of a solution of alum.

The coloring-matter so obtained can either be used directly or it can be converted into the form of its soluble bisulfite compound (which is especially suited for printing cotton goods) in the manner hereinafter described in Example 3.

Example 2: Mix about one hundred (100) parts of 1.8 dinitro-naphthalene and one thousand (1,000) to two thousand (2,000) parts of sulfuric acid (containing about ninety-six per cent. $H_2SO_4$) and heat the mixture to about 130° centigrade. To the solution add gradually about sixty (60) parts of antimony sulfid. A vigorous reaction takes place, and the solution, which was originally yellow, turns red. Work up in the manner described in the foregoing Example 1. The product so obtained also contains naphthazarin. If desired, the production of naphthazarin in admixture with the new coloring-matter can be prevented by continuing the treatment with hydrogen sulfid or antimony sulfid, as hereinbefore described, until test portions of the melt on pouring into water yield a product insoluble in water—that is, containing no admixed soluble product. The product obtained after this prolonged treatment with the sulfid is less suited for dyeing wool.

Example 3. To obtain the soluble bisulfite compound of the new coloring-matter, take about two hundred (200) parts of a paste of the new coloring-matter containing twenty-five per cent. of the new dye and mix them with seventy-five (75) parts of sodium bisulfite containing about forty per cent. real bisulfite $NaHSO_3$. Heat the mixture for from about four to six hours at a temperature of about 95° centigrade. The paste so obtained can be brought to a standard strength by the addition of water. It is completely soluble in boiling water and can be used for printing cotton goods, as hereinbefore mentioned.

My new coloring-matter in the insoluble form is a dark powder with a metallic luster which is preferably used in dyeing in the form of paste. It is but very slightly soluble in cold water, rather more soluble in boiling water, giving a dirty-blue-violet solution. The solution in concentrated sulfuric acid as also in fuming sulfuric acid (containing twenty-three per cent. free anhydrid) is dirty red-violet in color.

In the form of its soluble bisulfite compound my new coloring-matter is soluble in water, giving a yellow-brown solution. In sodium-carbonate solution the color is brown, changing slowly upon contact with air. The solution in caustic soda is also a brown color, which soon turns dirty-blue. In concentrated sulfuric acid the solution is dirty brown in color.

Now what I claim is—

1. The process for the production of a black coloring-matter which consists in treating 1.8 dinitro-naphthalene with concentrated sulfuric acid and a sulfid at a high temperature and converting the product so obtained into its soluble form by combination with a bisulfite, substantially as described.

2. The process for the production of a black coloring-matter which consists in treating 1.8 dinitro-naphthalene with concentrated sulfuric acid and a sulfid at a high temperature, substantially as described.

3. As a new article of manufacture the new black coloring-matter which can be obtained by treating 1.8 dinitro-naphthalene with concentrated sulfuric acid and hydrogen sulfid, and which is nearly insoluble in cold water, slightly soluble in boiling water giving a dirty-blue-violet solution, and which is soluble in concentrated and in fuming sulfuric acid (containing twenty-three per cent. $SO_3$) giving in both cases a dirty-red-violet solution, all substantially as described.

4. The herein-described dye which can be derived from dinitro-naphthalene, concentrated sulfuric acid and hydrogen sulfid, and which is soluble in cold water giving a yellow-brown solution, soluble in carbonate-of-sodium solution giving a brown solution which changes very slowly in the presence of air; soluble in caustic-soda solution with a brown color which soon changes to dirty blue, and which gives a dirty-brown solution in concentrated sulfuric acid, all substantially as described.

In testimony whereof I have hereunto set my hand in the presence of two subscribing witnesses.

RENÉ BOHN.

Witnesses:
ERNEST E. EHRHARDT,
BERNHARD C. HESSE.